US010345550B2

(12) United States Patent
Sekiguchi

(10) Patent No.: US 10,345,550 B2
(45) Date of Patent: Jul. 9, 2019

(54) LENS DRIVING DEVICE, CAMERA DEVICE, AND ELECTRONIC APPARATUS

(71) Applicant: New Shicoh Technology Co., Ltd., Kanagawa (JP)

(72) Inventor: Naoki Sekiguchi, Kanagawa (JP)

(73) Assignee: New Shicoh Technology Co., Ltd., Kanagawa (JP)

(*) Notice: Subject to any disclaimer, the term of this patent is extended or adjusted under 35 U.S.C. 154(b) by 528 days.

(21) Appl. No.: 15/099,636

(22) Filed: Apr. 15, 2016

(65) Prior Publication Data
US 2016/0313533 A1 Oct. 27, 2016

(51) Int. Cl.
*G02B 7/08* (2006.01)

(52) U.S. Cl.
CPC ...................................... *G02B 7/08* (2013.01)

(58) Field of Classification Search
CPC ... G02B 7/08; G02B 7/04; G02B 7/09; G02B 7/102; G02B 7/023; G02B 7/10; G02B 13/001; G02B 13/009; G02B 27/646; G02B 7/02; G02B 7/026; G02B 26/0833; G02B 7/022; G02B 7/025; G02B 15/14; G02B 26/085; G02B 3/14; G02B 7/005; G02B 7/182; G02B 13/0075; G02B 21/26; G02B 26/0825; G02B 26/0858; G02B 26/101; G02B 27/0006; G02B 27/0018; G02B 27/0025; G02B 27/005; G02B 27/648; G02B 3/0081; G02B 6/4457; G02B 6/4458; G02B 7/004; G02B 7/008; G02B 7/18;

(Continued)

(56) References Cited

U.S. PATENT DOCUMENTS

2007/0110424 A1 5/2007 Iijima et al.
2009/0295986 A1 12/2009 Topliss et al.
(Continued)

FOREIGN PATENT DOCUMENTS

CN 1910492 2/2007
CN 201273957 7/2009
(Continued)

OTHER PUBLICATIONS

Machine translation of JP 3186519.
(Continued)

*Primary Examiner* — Collin X Beatty
*Assistant Examiner* — Grant A Gagnon
(74) *Attorney, Agent, or Firm* — Fildes & Outland, P.C.

(57) ABSTRACT

The lens driving device includes: a housing, a lens holder, and first and second spring members that support the lens holder at both sides of the lens holder in an optical axis direction; wherein the first and second spring member each has a housing side fixing member fixed to the housing, a lens holder side fixing member fixed to the lens holder, and elastic arms therebetween. A first connecting point connecting the elastic arm with the housing side fixing member and a second connecting point connecting the elastic arm with the lens holder side fixing member are arranged offset to each other in a circumferential direction and an offset direction of the second connecting point to the first connecting point in the first spring member and an offset direction of the second connecting point to the first connecting point in the second spring member are opposite.

7 Claims, 7 Drawing Sheets

(58) Field of Classification Search
CPC ........ G02B 7/1828; G02B 7/28; G02B 7/365; G03B 3/10; G03B 2205/0069; G03B 2205/0046; G03B 5/00; G03B 13/34; G03B 13/36; G03B 17/02; G03B 2205/0007; G03B 2205/0053; G03B 2205/0084; G03B 13/32; G03B 17/12; G03B 17/14; G03B 2205/0061; G03B 2206/00; G03B 13/00; G03B 17/00; G03B 17/18; G03B 2217/007; G03B 3/02; G03B 9/22; H02K 41/0356; H02K 33/18; H02K 41/03; H02K 41/035; H02K 41/0354; H02K 41/031; H02K 2211/03; H02K 37/12; H02K 15/00; H02K 2205/03; H02K 23/04; H02K 33/02; H02K 35/00; H02K 41/02; H02K 5/00; H02K 5/10; H02K 5/225; H02K 7/14; H04N 5/2254; H04N 5/2257; H04N 5/23212; H04N 5/2253; H04N 5/23296; H04N 5/2252; H04N 5/2328; H04N 5/23203; H04N 5/23241; H04N 5/23248; H04N 5/23264; H04N 5/23287; H02N 2/026; H02N 2/001; H02N 2/0015; H02N 2/0055; H02N 2/103; H02N 2/004; H02N 2/006; H02N 2/0065; H02N 2/101; H02N 2/12; H02N 1/008; H02N 2/008; H02N 2/02; H02N 2/043; H02N 2/062; H02N 2/126; H02N 2/14; H02N 2/142; H02N 2/163
USPC .......................................................... 359/824
See application file for complete search history.

(56) References Cited

U.S. PATENT DOCUMENTS

| | | | | |
|---|---|---|---|---|
| 2011/0235198 A1* | 9/2011 | Furuya | ..................... | G02B 7/08 359/824 |
| 2015/0260948 A1* | 9/2015 | Yamakage | ............... | G02B 7/09 359/824 |

FOREIGN PATENT DOCUMENTS

| | | |
|---|---|---|
| CN | 204116687 | 1/2015 |
| JP | 4077497 | 2/2008 |
| JP | 2009-531729 | 9/2009 |
| JP | 2009-282090 | 12/2009 |
| JP | 2012-255973 | 12/2012 |
| JP | 3186519 | 9/2013 |

OTHER PUBLICATIONS

Office Action in corresponding application CN201510481611.7 dated Apr. 25, 2017 and English translation.
English language machine translation of CN204116687.
Office Action issued in corresponding Japanese Patent Application No. 2015-086723, dated Aug. 6, 2018, and English translation.
English language abstract and machine translation of JP2009-282090.
English language abstract and machine translation of JP2012-255973.
Office Action issued in corresponding Japanese Patent Application No. 2015-086723, dated Mar. 19, 2019, and English translation.
English language abstract for CN201273957.

* cited by examiner

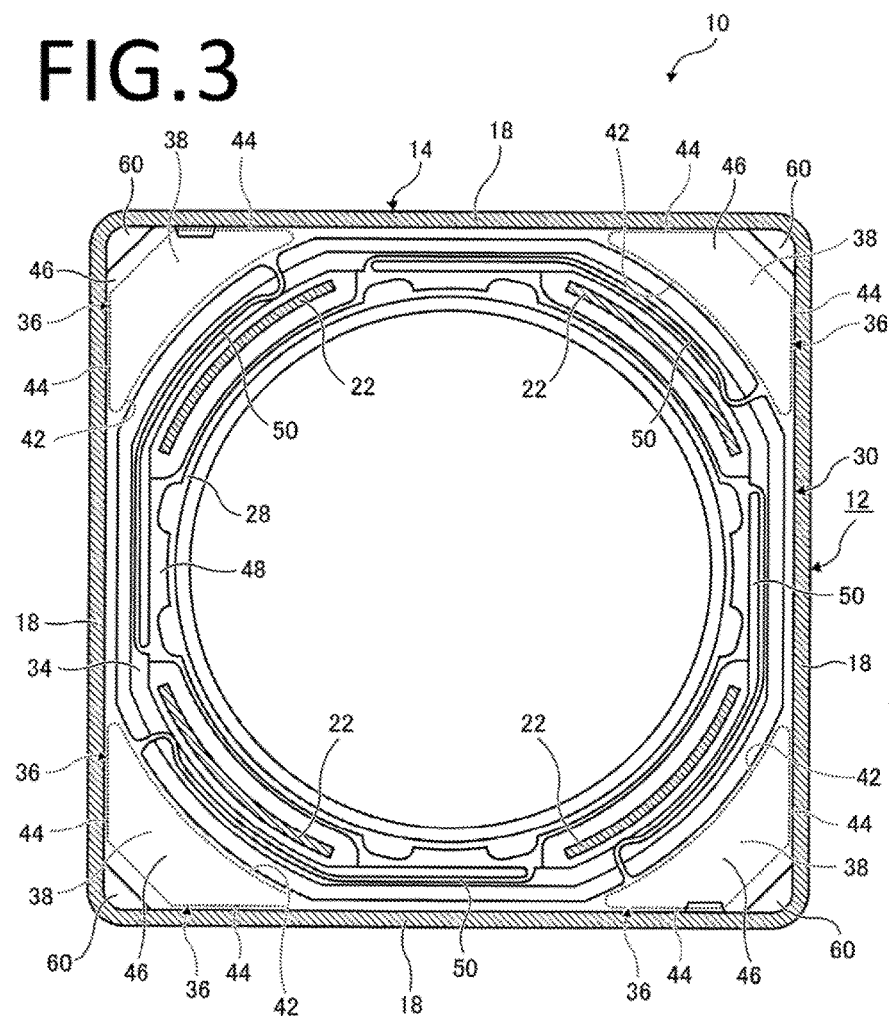

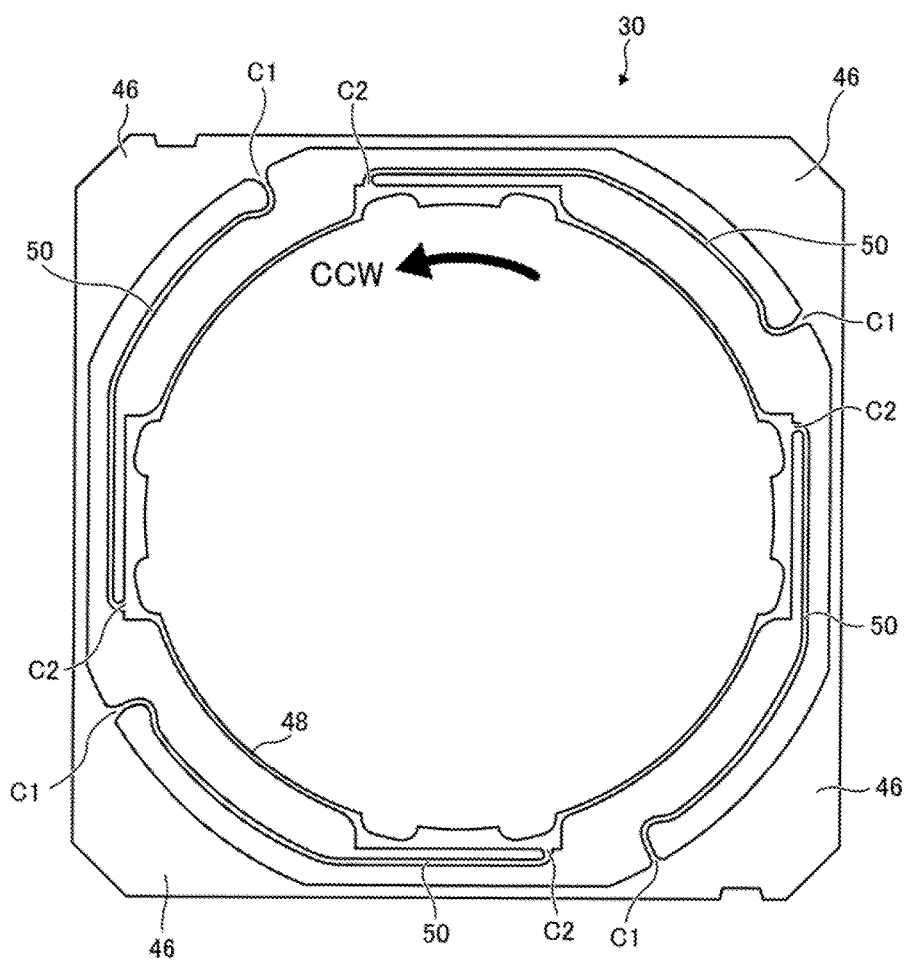

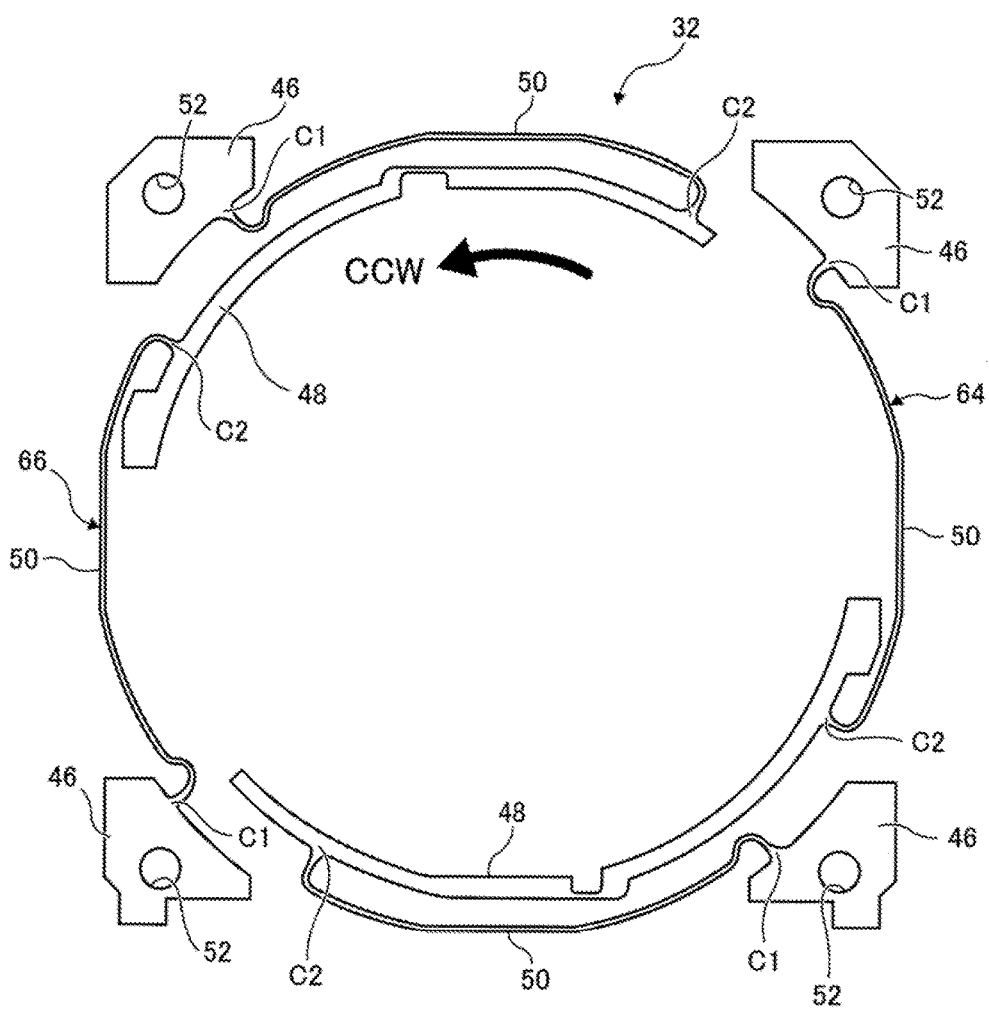

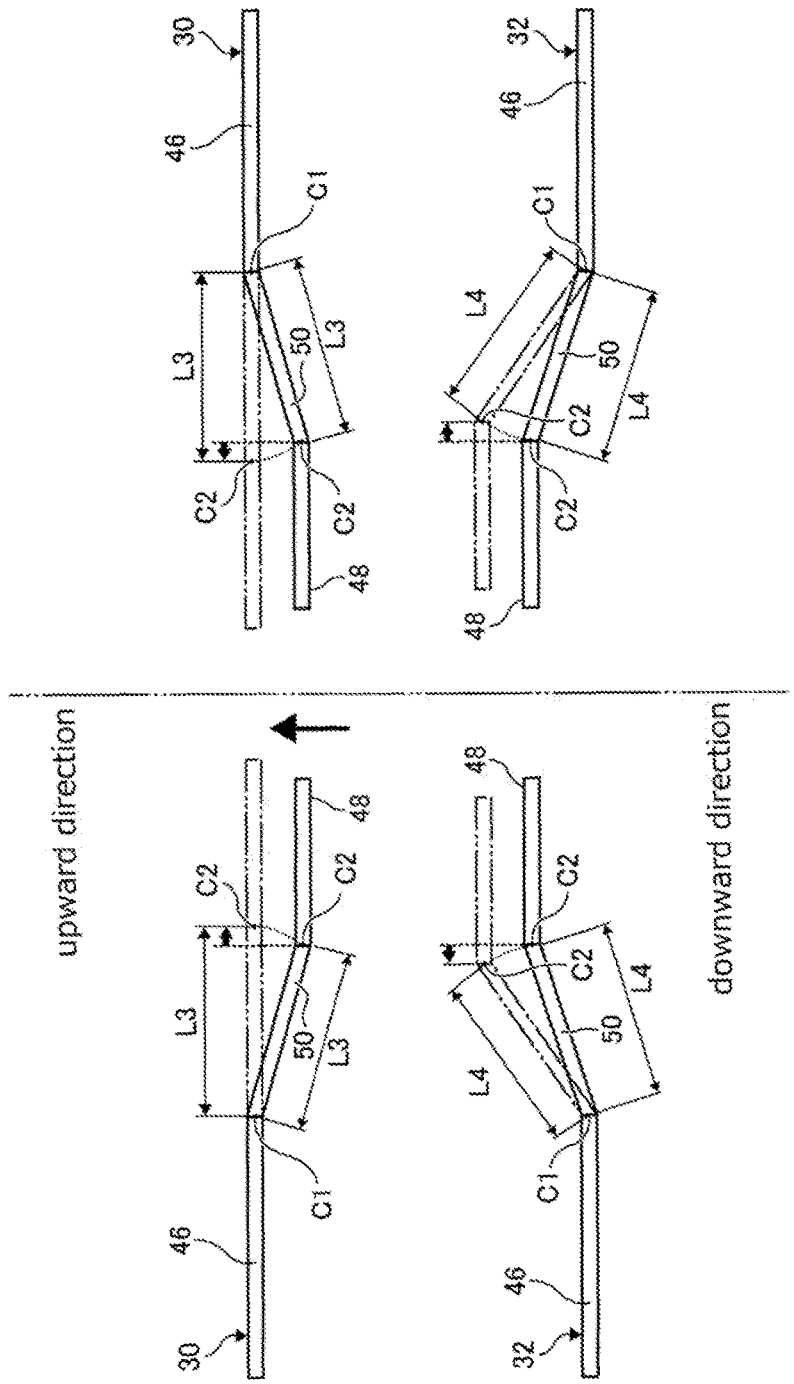

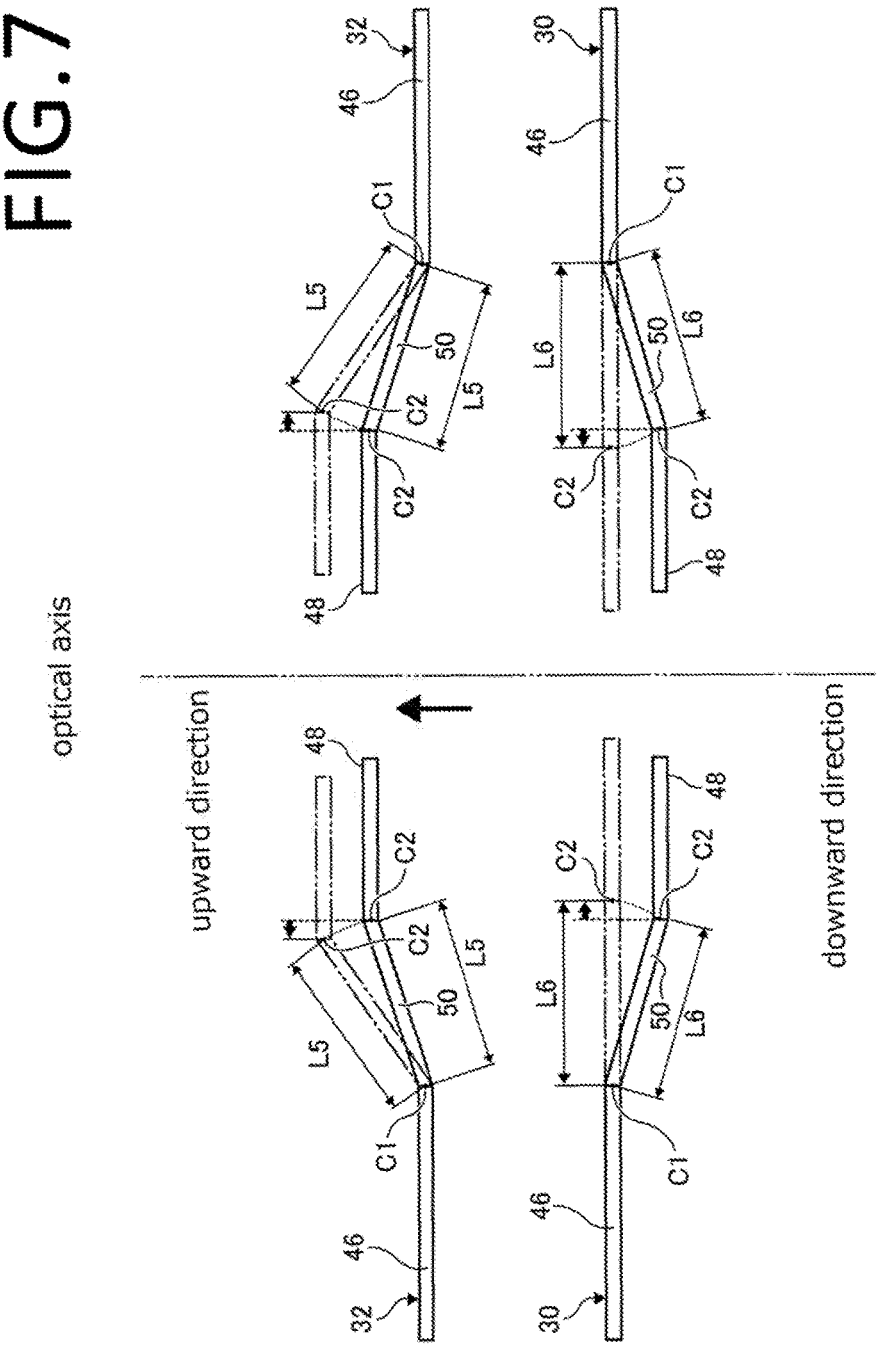

LENS DRIVING DEVICE, CAMERA DEVICE, AND ELECTRONIC APPARATUS

CROSS REFERENCE TO RELATED APPLICATIONS

This application claims priority to Japanese Patent Application No. 2015-086723 filed on Apr. 21, 2015; and the entire contents of which are incorporated by reference herein.

TECHNICAL FIELD

This invention relates to a lens driving device, a camera device, and an electronic apparatus.

BACKGROUND ART

Electronic apparatuses such as cellular phones and smart phones are equipped with a miniaturized camera. The miniaturized camera of this type is an automatic focusing type. The miniaturized camera of this automatic focusing type includes a lens driving device for actuating the lens to move.

The Publication of Japanese Utility Model Registration No. 3186519 discloses a lens driving device in which a lens holder for supporting a lens is provided within a frame, the lens holder is supported by spring members at the both sides thereof optical axis direction so that the lens holder can move toward both directions along the optical axis.

SUMMARY

In the above prior art, the spring members include first parts fixed to the frame, second parts fixed to the lens holder, and elastic arms connecting the first parts with the second parts. In each elastic arm, its connecting point to the first part thereof and its connecting point to the second part thereof are arranged offset to each other in a circumferential direction. When the lens holder moves along the optical axis direction, the elastic arms follow the movement of the lens holder and are elastically deformed along the optical axis direction. When the elastic arms are elastically deformed, the elastic arms make the lens holder rotate in the circumferential direction since the overall length of the elastic arms does not change and the connecting point to the first part and the connecting point to the second part are arranged offset from each other in the circumferential direction. It raises a problem of making the posture of the lens holder be unstable.

The present invention aims to solve the problem of the prior art, and to provide a lens driving device, a camera device, and an electronic apparatus which are able to stabilize the posture of the lens holder.

According to one embodiment of the present invention, a lens driving device including: a housing; a lens holder that is for supporting a lens and is arranged inside the housing; and a first spring member and a second spring member that support the lens holder at both sides of the lens holder in an optical axis direction so that the lens holder can move freely; wherein the first spring member and the second spring member each has a housing side fixing member that is fixed to the housing, a lens holder side fixing member that is fixed to the lens holder, and an elastic arm that connects the housing side fixing member with the lens holder side fixing member; the lens holder side fixing members of both the first spring member and the second spring member are arranged within a width between the housing side fixing members of both the first spring member and the second spring member in the optical axis direction or are arranged outside of the width between the housing side fixing members of both the first spring member and the second spring member in the optical axis direction; a first connecting point connecting the elastic arm with the housing side fixing member and a second connecting point connecting the elastic arm with the lens holder side fixing member are arranged offset to each other in a circumferential direction and wherein an offset direction of the second connecting point to the first connecting point in the first spring member and an offset direction of the second connecting point to the first connecting point in the second spring member are opposite when viewing from one side of the optical axis direction.

Further according to another aspect of the present invention, a lens driving device including: a housing; a lens holder that is for supporting a lens and is arranged inside the housing; and a first spring member and a second spring member that support the lens holder at both sides of the lens holder in an optical axis direction so that the lens holder can move freely; wherein the first spring member and the second spring member each has a housing side fixing member that is fixed to the housing, a lens holder side fixing member that is fixed to the lens holder, and an elastic arm that connects the housing side fixing member with the lens holder side fixing member; a first connecting point connecting the elastic arm with the housing side fixing member and a second connecting point connecting the elastic arm with the lens holder side fixing member are arranged offset to each other in a circumferential direction and wherein an offset direction of the second connecting point to the first connecting point in the first spring member and an offset direction of the second connecting point to the first connecting point in the second spring member are opposite when viewing from one side of the optical axis direction; and when the lens holder moves along the optical axis direction, the lens holder side fixing member moves close to the housing side fixing member in the first spring member while the lens holder side fixing member moves apart from the housing side fixing member in the second spring member.

Preferably, the lens holder is in no contact with the housing when the lens holder do not move along the optical axis direction.

Preferably, at least one of the first spring member and the second spring member has a plurality of elastic arms, and the offset direction of the connecting points of the elastic arms in each one of the first spring member and the second spring member is the same.

Preferably, the each elastic arm of at least one of the first spring member and the second spring member is formed as one elongated arc shaped member.

Further, a magnet is fixed in the housing at an inner surface thereof, and the elastic arm of at least one of the first spring member and the second spring member is arranged inside of and apart from an area where the magnet is located when viewing from one side of the optical axis direction.

According to another aspect of the present invention, a camera device includes: a lens driving device; a lens supported by a lens holder; and a photo detecting sensor receiving through the lens.

Further according to another aspect of the present invention, an electronic device is equipped with the camera apparatus.

According to the present invention, when the lens holder moves along the optical axis direction, the elastic arm of one of the first spring member and the second spring member increases its elastic deformation amount while the elastic arm of the other one of the first spring member and the second spring member decreases its elastic deformation amount. In this moment, the elastic arm of one of the first spring member and the second spring member rotates the lens holder so that the second connecting point moves close to the first connecting point in a circumferential direction when viewing from one side of the optical axis direction. Further, the elastic arm of other one of the first spring member and the second spring member rotates the lens holder so that the second connecting point moves apart from the first connecting point in the circumferential direction. Since an offset direction of the second connecting point to the first connecting point in the first spring member and the offset direction of the second connecting points to the first connecting points in the second spring member are set in the opposite circumferential direction to each other when viewing from one side of the optical axis direction, thus the leas holder rotates into the same circumferential direction at the positions of the first spring member and the second spring member. Therefore, since there is less possibility that the lens holder tilts deviating from the optical axis direction, the posture of the lens holder can be stable.

BRIEF DESCRIPTION OF THE DRAWINGS

FIG. 3 shows the lens driving device according to the first embodiment of the present invention and is a cross-sectional view of B-B line of FIG. 2.

FIG. 4 shows a first spring member employed in the lens driving device according to the first embodiment of the present invention and is a plan view viewing from the front side of the optical axis direction.

FIG. 5 shows second spring member employed in the lens driving device according to the first embodiment of the present invention and is a plan view viewing from the front side of the optical axis direction.

FIG. 6 is an explanatory drawing for explaining how the first spring member and the second spring member work in the first embodiment of the present invention.

FIG. 7 is an explanatory drawing for explaining how the first spring member and the second spring member work in the second embodiment of the present invention.

DETAILED DESCRIPTION

Embodiments of the present invention will be described hereinafter with reference to the drawings.

Figure 1:
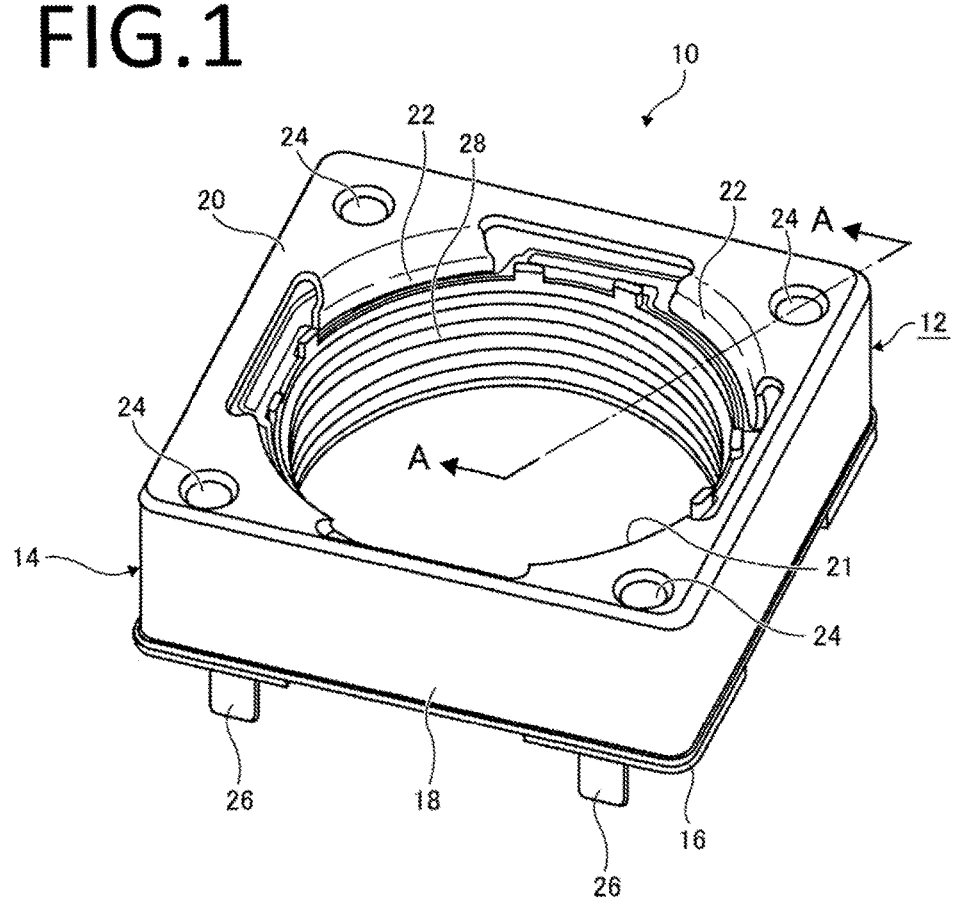
FIG. 1 is a perspective view of a lens driving device according to the first embodiment of the present invention.

FIG. 1 is a perspective view of the lens driving device 10 according to the first embodiment of the present invention. The lens driving device 10 has a housing 12 formed as a rectangular parallelepiped shape. The housing 12 includes a yoke 14 and a base 16.

The yoke 14 is a rectangular parallelepiped shape and has an outer wall 18 which encloses four sides thereof and a top wall 20 which is provided on the top thereof. The top wall 20 is formed with a first hole 21 which has a substantially circular shape and through which first hole 21 the light passes. The first hole 21 is formed with internal walls 22 projected downward from the inner four regions thereof which are near the four corners of the yoke 14. The top wall 20 is formed with recessed parts 24 which are recessed downward at the four corners of the top wall 20.

It would be noted throughout this explanation that the direction toward upper side in the drawing of FIG. 1 is referred to as an upward direction while the direction toward the lower side is referred to as a downward direction, and the upward direction corresponds to the front side of the optical axis direction and the downward direction corresponds to a rear side of the optical axis direction.

Two terminals 26, 26 project downward from the base 16. A lens holder 28 as mentioned bellow is assembled inside the housing 12.

Figure 2:
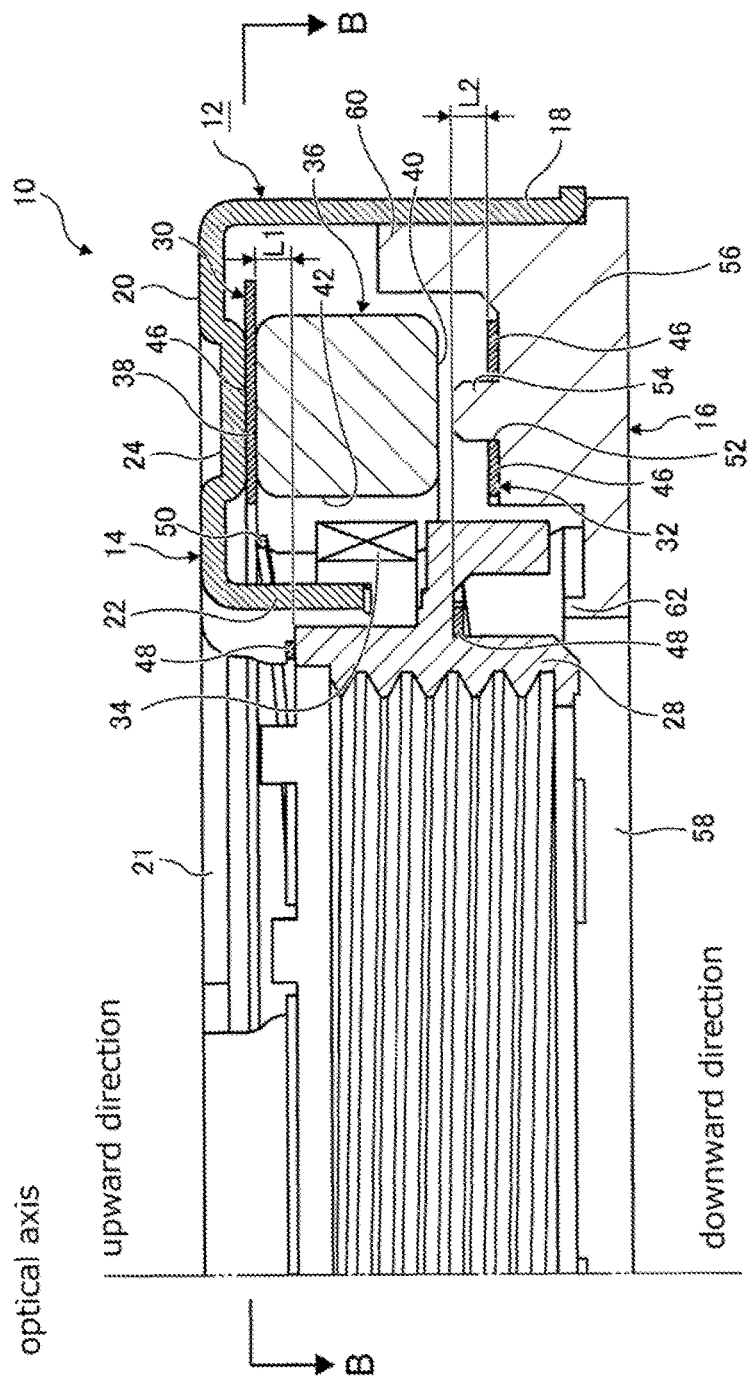
FIG. 2 shows the lens driving device according to the first embodiment of the present invention and is a cross-sectional view of A-A line of FIG. 1.

FIG. 2 is a cross-sectional view along the line A-A of FIG. 1, and FIG. 3 is a cross-sectional view along the line B-B of FIG. 2.

In FIGS. 2 and 3, the lens holder 28 has a cylindrical shape and is formed with threads on its inner surface thereof so that the lens (not shown) can be screwed and be fastened on the inside of the lens holder 28. The top of the lens holder 28 is supported by the first spring member 30 while the bottom of the lens holder 28 is supported by the second spring member 32 so that the lens holder 28 can freely move up and down.

A coil 34 is mounted around the lens holder 28 along its external periphery. The coil 34 is formed as substantially a circular-ring shape. The coil 34 is formed by winding a core wire made of metal such as copper. Gaps are formed between the coil 34 and the lens holder 28 at the four corner of the yoke 14 to which gaps the internal walls 22 of the yoke 14 are inserted. By means of the inner walls 22, the coil 34 is interposed between magnets 36 as mentioned below and the yoke 14 so as to form a magnetic circuit.

The magnets 36 include, for example, four magnetic pieces. The each magnet 36 is fixed inside the each corner of the yoke 14. The each magnet 36 is formed as a crescent shape. The magnet 36 has a planar top surface 38, a planar bottom surface 40, and a coil facing surface 42 which faces the coil 34 and is formed as an arc-shaped surface so as to keep the distance to the coil 34 constant. The magnet 36 is further formed with two yoke fixing faces 44, 44 at the back side opposing from the coil facing surface 42. The magnet 36 is fixed to the yoke 14 by fixing the yoke fixing faces 44, 44 inside the outer wall 18 by making use of an adhesive material.

The first spring member 30 and the second spring member 32 each has a housing side fixing member 46, a lens holder side fixing member 48, and elastic arms 50 which connect the housing side fixing member 46 with the lens holder side fixing member 48. The housing side fixing member 46 of the first spring member 30 is interposed and fixed between the recessed part 24 and the top surface 38 of the magnet 36. The housing side fixing members 46 of the second spring member 32 are fixed onto the base 16 by engaging positioning protrusions 54 formed in the base 16 with the engagement holes 52 (also shown in FIG. 5) formed in the second spring member 32.

In the first spring member 30 and the second spring member 32, the lens holder side fixing members 48, 48 are arranged within the width between the housing side fixing members 46, 46 in the optical axis direction. That is to say, as for the first spring member 30, the lens holder side fixing member 48 is positioned at a lower height than the height of the housing side fixing member 46. As for the second spring member 32, the lens holder side fixing members 48 are positioned at a higher height than the height of the housing side fixing members 46. The lens holder 28 is biased toward the opposing directions by the first spring member 30 and the second spring member 32, thereby the lens holder side fixing member(s) 48 of the first spring member 30 or the second spring member 32 moves up to substantially the same height with the housing side fixing member 46 against the biasing forces of the first spring member 30 and the second spring member 32. In the initial state in which no electric current flows through the coil 34, the lens holder 28 is supported by the first spring member 30 and the second spring member 32 in a floated manner without any contact with the base 16.

In this case, the needed height in order to move the lens holder 28 along the optical axis direction corresponds to the width between the housing side fixing members 46, 46 in the optical axis direction, i.e. to the difference between the height of the housing side fixing member 46 of the first spring member 30 and the height of the housing side fixing member 46 of the second spring member 32. If the housing side fixing member 46, 46 and the lens holder side fixing member 48, 48 are in the same level of height in the initial state, a movement distance for the movement of the lens holder 28 and the aforementioned width between the housing side fixing members 46, 46 will be needed in order to move the lens holder 28 along the optical axis direction. Therefore, in the lens driving device 10 of the first embodiment, the needed gap in the optical axis direction can be decreased in comparison with a lens driving device of the type in which the housing side fixing member 46, 46 and the lens holder side fixing member 48, 48 are in the same level of the height in its initial state.

Further, since the housing side fixing member 46 of the first spring member 30 and the housing side fixing member 46 of the second spring member 32 are apart from each other, thus the magnet 36 can be enlarged for the width between the housing side fixing members 46 can be increased), the coil 34 can have a low profile, as a result, the lens driving device 10 can have a low profile (the height thereof in the optical axis direction can be decreased). If the housing side fixing members 46, 46 and the lens holder side fixing members 48, 48 are in the same plane and the elastic arms 50, 50 of the first spring member 30 and the second spring member 32 have the same spring coefficients when the first spring member 30 and the second spring member 32 are in the non-biased state before the assemble of the first spring member 30 and the second spring member 32 into the lens driving device 10, in the initial state in which no electric current flows though the coil 34, the relation between the distance L1 between the housing side fixing member 46 and the lens holder side fixing member 38 of the first spring member 30 and the distance L2 between the housing side fixing member 46 and the lens holder side fixing member 48 of the second spring member 32 is shown as L1=L2.

The base 16 has a circular second hole 58 formed inside the rectangular base body 56 through which second hole 58 the light passes.

The base body 56 is formed with protrusions 60 projecting upward at the four corners thereof to which protrusions 60 the inner surface of the lower part of the yoke 14 is fitted and between which protrusions 60 and the lower yoke 14 is applied an adhesive material so that the yoke 14 and the base 16 are fixed together. The base body 56 has a dustproof wall 62 projecting upward and formed around the periphery of the second hole 58 so as to prevent contamination from falling into the inside of the second hole 58.

The second spring member 32 is, as shown in FIG. 5, divided into a first member 64 and a second member 66. The housing side fixing member 46 of the first member 64 is connected to one of the aforementioned terminals 26, 26 (shown in FIG. 1) while the housing side fixing member 46 of the second member 66 is connected to the other one terminal 26. The lens holder side fixing member 48 of the first member 64 is connected to the one end of the coil 34 while the lens holder side fixing member 48 of the second member 66 is connected to the other end of the coil 34.

The aforementioned lens holder 28 supports a lens. A lens driving device 10 in which the lens holder 28 holding the lens is installed in a camera device. In the camera device, light input from an imaging target through the lens is detected by a photo detecting sensor. A controller which is provided in the camera calculates a movement amount of the lens for focusing on the imaging target. The controller controls electric current so as to flow through the coil 34 corresponding to the movement amount of the lens. The electric current flows from the one terminal 26 via the one of the second spring member 32 (the first member 64 or the second member 66) to the coil 34, and from the coil 34 via the other one of the second spring member 32 (the second member 66 or the first member 64) to the other terminal 26. When the electric current flows through the coil 34, affected by the magnetic flux generated by the magnets 36, the coil 34 generates an upward or downward electromagnetic force. When the electromagnetic force is generated in the coil 34, the lens, together with the coil 34 and the lens holder 28, moves against the biasing forces of the first spring member 30 and the second spring member 32.

The first spring member 30 and the second spring member 32 are described hereinafter more precisely.

FIG. 4 is a plan view of the first spring member 30 when viewing from the above. FIG. 5 is a plan view of the second spring member 32 when viewing from the above.

Each elastic arm 50 of the first spring member 30 and the second spring member 32 is formed as one elongated arc shaped member without any folded part. In the first spring member 30 and the second spring member 32, four elastic arms 50 are provided apart from each other by a distance of 90°. When connecting points connecting the elastic arms 50 with the housing side fixing members 46 are refereed to as first connecting points C1 while connecting points connecting the elastic arms 50 with the lens holder side fixing members 48 are refereed to as second connecting points C2, the second connecting points C2 are arranged offset to the first connecting points C1 in the circumferential direction. In the first spring member 30, the second connecting point C2 of the each four elastic arm 50 is arranged offset to the first connecting point C1 thereof in the counter clockwise direction viewing from the front side of the optical axis direction. On the other hand, in the second spring member 32, the second connecting point C2 of the each four elastic arm 50 is arranged offset to the first connecting point C1 thereof in the clockwise direction viewing from the front side of the optical axis direction.

That is to say, the first connecting points C1 and the second connecting points C2 of the elastic arms 50 of the first spring member 30 and the second spring member 32, respectively, are all arranged offset in the same circumferential direction while the first connecting points C1 and the second connecting points C2 of the elastic arms 50 of the second spring member 32 are arranged offset in the opposite circumferential direction to said offset circumferential direction of the connecting points C1, C2 of the first spring member 30.

The reason why the connecting points C1, C2 of the elastic arms 50 are arranged offset in the opposite circumferential directions is explained as follows.

Since the lens holder side fixing member 48 moves along with the lens holder 28, as shown in FIG. 6, when the lens holder 28 moves upward, the lens holder side fixing member 48 moves close to the housing side fixing member 46. In this moment, although the elastic deformation amount of the elastic arms 50 decreases however, the original length L3 of the elastic arms 50 remains unchanged, thus the elastic arms 50 deform so that the second connecting points C2 move apart from the first connecting points C1 in the circumferential direction. That is to say, the lens holder 28 along with the lens holder side fixing member 48 rotates in the counter clockwise direction as shown in FIG. 4. On the other hand, in the second spring member 32, the lens holder side fixing members 48 move farther away from the housing side fixing members 46. In this moment, although the elastic deformation amount of the elastic arms 50 increases however, the original length L4 of the elastic arms 50 remains unchanged, thus the elastic arms 50 deform so that the second connecting points C2 move close to the first connecting points C1 in the circumferential direction. That is to say, the lens holder 28 along with the lens holder side fixing member 48 rotates in the counter clockwise direction as shown in FIG. 5. Thus, since the elastic arms 50 of the first spring member 30 and the elastic arms 50 of the second spring member 32 deform so that the lens holder 28 rotates in the same counter clockwise direction, the lens holder 28 can be thereby kept supported in parallel to the optical axis during the movement of the lens holder 28 in the optical axis direction.

Each elastic arm 50 of the first spring member 30 is formed as one elongated arc shaped member without any folded part as described before, and is arranged inside of and apart from the area where the magnet 36 is located when viewing from the above as shown FIG. 3. Therefore, the magnets 36 do not interfere with the movement of the elastic arms 50 even if the arranged areas of the magnets 36 are included in the movement areas of the elastic arms 50 in the optical axis direction, thus the lens driving device 10 can have a lower profile.

Further, as shown in FIG. 3, arc shaped spaces are formed between the lens holder side fixing member 48 and the elastic arms 50 of the first spring member 30. The arc shaped internal walls 22 of the yoke 14 are arranged inside these spaces, thereby the interference of the internal walls 22 of the yoke 14 with the first spring member 30 can be avoided.

The second embodiment of the present invention will be explained hereinafter.

In the aforementioned first embodiment, the lens holder side fixing members 48, 48 are arranged within the width between the housing side fixing members 46, 46 in the optical axis direction. On the other hand, in the second embodiment, the lens holder side fixing members 48, 48 are arranged outside of the width between the housing side fixing members 46, 46 in the optical axis direction. That is to say, in the initial state, the lens holder side fixing member 48 of the first spring member 30 is positioned at a height higher the height of the housing side fixing member 46 thereof while the lens holder side fixing members 48 of the second spring member 32 are positioned at a height lower than the height of the housing side fixing members 46 thereof.

When the lens holder 28 moves upward from the such initial state, although the elastic deformation amount of the elastic arms 50 of the first spring member 30 increases however, the original length L5 of the elastic arms 50 remains unchanged, thus the elastic arms 50 deform so that the second connecting points C2 move close to the first connecting points C1 in the circumferential direction. On the other hand, although the deformation amount of the elastic arms 50 of the second spring member 32 decreases however, the original length L6 of the elastic arms 50 remains unchanged, thus the elastic arms 50 deform so that the second connecting points C2 move apart from the first connecting points C1 in the circumferential direction. Therefore, if the first spring member 30 and the second spring member 32 are the same constructions as the ones in the FIGS. 3 and 4, the elastic arms 50 of the first spring member 30 and the elastic arms 50 of the second spring member 32 deform so that the lens holder 28 rotates in the same clockwise direction. Therefore, since the offset direction of the connecting points C1, C2 of the elastic arms 50 to the first spring member 30 and the offset direction of the connecting points C1, C2 of the elastic arms 50 to the second spring member 32 are set in the opposite circumferential direction to each other as the same manner in the aforementioned first embodiment, the rotation direction of the lens holder 28 can be the same.

In the above two embodiments, the first spring member 30 and the second spring member 32 exert biasing forces to the lens holder 28 in a direction opposite to the optical axis direction in the initial state. However, it may be possible that only one of the first spring member 30 and the second spring member 32 exert a biasing force to the lens holder 28 or none of them exerts a biasing force thereto.

In the initial state, the lens holder 28 is supported by the first spring member 30 and the second spring member 32 in the floated manner without any contact with the base 16. However, it may be possible that the lens holder 28 is biased by the base 16.

Further, the each elastic arm 50 is formed as one elongated arc shaped member without any folded part. However it may be possible that the elastic arm 50 has at least one folded part.

What is claimed is:

1. A lens driving device comprising:
   a housing;
   a lens holder that is for supporting a lens and is arranged inside the housing; and
   a first spring member and a second spring member that support the lens holder at both sides of the lens holder in an optical axis direction so that the lens holder can move freely; wherein
   the first spring member and the second spring member each has a housing side fixing member that is fixed to the housing, a lens holder side fixing member that is fixed to the lens holder, and an elastic arm that connects the housing side fixing member with the lens holder side fixing member;
   the lens holder side fixing members of both the first spring member and the second spring member are respectively arranged at a predetermined distance away from the housing side fixing members of the first spring member and the second spring member in the optical axis direction, and the lens holder side fixing members of both the first spring member and the second spring member are arranged inside a width between the housing side fixing members of both the first spring member and the second spring member in the optical axis direction or are arranged outside the width between the housing side fixing members of both the first spring member and the second spring member in the optical axis direction;
   a first connecting point connecting the elastic arm with the housing side fixing member and a second connecting point connecting the elastic arm with the lens holder side fixing member are arranged offset to each other in a circumferential direction and wherein an offset direction of the second connecting point to the first connecting point in the first spring member and an offset direction of the second connecting point to the first connecting point in the second spring member are opposite when viewing from one side of the optical axis direction.

2. The lens driving device according to claim 1, wherein the lens holder is in no contact with the housing when the lens holder do not move along the optical axis direction.

3. The lens driving device according to claim 1, wherein at least one of the first spring member and the second spring member has a plurality of elastic arms, and the offset direction of the connecting points of the elastic arms in each one of the first spring member and the second spring member is the same.

4. The lens driving device according to claim 1, wherein the each elastic arm of at least one of the first spring member and the second spring member is formed as one elongated arc shaped member.

5. The lens driving device according to claim 4, wherein a magnet is fixed in the housing at an inner surface thereof, and the elastic arm of at least one of the first spring member and the second spring member is arranged inside of and apart from an area where the magnet is located when viewing from one side of the optical axis direction.

6. A camera device comprising:
a lens driving device;
a lens supported by a lens holder; and
a photo detecting sensor receiving through the lens; wherein
the lens driving device includes:
a housing;
the lens holder that supports the lens and is arranged inside the housing; and
a first spring member and a second spring member that support the lens holder at both sides of the lens holder in an optical axis direction so that the lens holder can move freely; wherein
the first spring member and the second spring member each has a housing side fixing member that is fixed to the housing, a lens holder side fixing member that is fixed to the lens holder, and an elastic arm that connects the housing side fixing member with the lens holder side fixing member;
the lens holder side fixing members of both the first spring member and the second spring member are respectively arranged at a predetermined distance away from the housing side fixing members of the first spring member and the second spring member in the optical axis direction, and the lens holder side fixing members of both the first spring member and the second spring member are arranged inside a width between the housing side fixing members of both the first spring member and the second spring member in the optical axis direction or are arranged outside the width between the housing side fixing members of both the first spring member and the second spring member in the optical axis direction;
a first connecting point connecting the elastic arm with the housing side fixing member and a second connecting point connecting the elastic arm with the lens holder side fixing member are arranged offset to each other in a circumferential direction and wherein an offset direction of the second connecting point to the first connecting point in the first spring member and an offset direction of the second connecting point to the first connecting point in the second spring member are opposite when viewing from one side of the optical axis direction.

7. An electronic apparatus being equipped with a camera device wherein
the camera device comprising:
a lens driving device;
a lens supported by a lens holder; and
a photo detecting sensor receiving through the lens; wherein
the lens driving device includes:
a housing;
the lens holder that supports the lens and is arranged inside the housing; and
a first spring member and a second spring member that support the lens holder at both sides of the lens holder in an optical axis direction so that the lens holder can move freely; wherein
the first spring member and the second spring member each has a housing side fixing member that is fixed to the housing, a lens holder side fixing member that is fixed to the lens holder, and an elastic arm that connects the housing side fixing member with the lens holder side fixing member;
the lens holder side fixing members of both the first spring member and the second spring member are respectively arranged at a predetermined distance away from the housing side fixing members of the first spring member and the second spring member in the optical axis direction, and the lens holder side fixing members of both the first spring member and the second spring member are arranged inside a width between the housing side fixing members of both the first spring member and the second spring member in the optical axis direction or are arranged outside the width between the housing side fixing members of both the first spring member and the second spring member in the optical axis direction;
a first connecting point connecting the elastic arm with the housing side fixing member and a second connecting point connecting the elastic arm with the lens holder side fixing member are arranged offset to each other in a circumferential direction and wherein an offset direction of the second connecting point to the first connecting point in the first spring member and an offset direction of the second connecting point to the first connecting point in the second spring member are opposite when viewing from one side of the optical axis direction.

* * * * *